United States Patent [19]

Luecke et al.

[11] Patent Number: 5,006,597

[45] Date of Patent: Apr. 9, 1991

[54] BLACK TOPCOATING COMPOSITION

[75] Inventors: Arthur A. Luecke, Kirtland; Terry E. Dorsett, Chardon, both of Ohio

[73] Assignee: Metal Coatings International Inc., Chardon, Ohio

[21] Appl. No.: 364,314

[22] Filed: Jun. 12, 1989

Related U.S. Application Data

[63] Continuation of Ser. No. 104,998, Oct. 6, 1987, abandoned.

[51] Int. Cl.$^5$ ................................................. B32B 9/06
[52] U.S. Cl. ...................................... 524/556; 524/557
[58] Field of Search ................................ 524/556, 557

[56] References Cited

U.S. PATENT DOCUMENTS 4,555,445 11/1985 Frey .................................... 523/442
4,891,394 1/1990 Savin ................................... 523/442

*Primary Examiner*—Sam Silverberg
*Attorney, Agent, or Firm*—John J. Freer

[57] ABSTRACT

The present invention relates particularly to a one-package, black-pigmented, corrosion resistant coating composition, of excellent storage stability and being especially suitable for application over metal that has been coated with a composition containing chromium in non-elemental form. More specifically, the coating composition of the invention is formulated from an intimate blend of aqueous carbon black colloidal dispersion in aqueous medium, which is in further mixture with thickening agent aqueous acrylic resin dispersion and silica sol having a pH of not above about 10.

16 Claims, No Drawings

BLACK TOPCOATING COMPOSITION

This is a continuation of application Ser. No. 104,998, filed Oct. 6, 1987 now abandoned.

BACKGROUND OF THE INVENTION

It has been known to coat substrates such as wallboard with heavy coatings of air-curable, alkali-metal-containing silicas blended with copolymer dispersions. As taught in U.S. Pat. No. 4,002,590, such compositions are usefully heavily loaded with aggregates so as to form the heavy coatings.

It has also been well known to protect metal surfaces from corrosion by surface treatment with corrosion resistant coating materials. The corrosion resistance of silicate coatings has been shown. Some of these may contain many ingredients, including several pigments as well as being resin-containing, but ingredients must be separately packaged and mixed just prior to application, as has been disclosed in U.S. Pat. No. 3,297,616.

A variety of resinous and resin-free chromium containing coatings for protecting ferrous substrates are also known. Representative coating compositions can be relatively simplistic such as the compositions that may essentially contain chromic acid and particulate metal in an alcohol medium as disclosed in U.S. Pat. No. 3,687,738.

Other more complex compositions as disclosed in U.S. Pat. No. 3,907,608 may contain the pulverulent metal and hexavalent chromium-providing substance plus high-boiling organic liquid. Such coatings over ferrous surfaces provide a highly desirable protection against red rust upon exposure to the surface to salt solution.

In the protection of ferrous surfaces, it is also known to apply coating composite systems consisting of a basecoat and subsequent topcoat. For example, in the protection of zinc coated steel surfaces, the zinc surface is treated with chromate and then subsequently treated with a topcoat of a silicate material, e.g., potassium and/or sodium silicate. The chromate/silicate coating offers corrosion resistance against white rusting of the zinc basecoat, as has been discussed in Japanese Patent Disclosure No.: Showa 53-125239. Or the zinc surface, which may be phosphated, can be topcoated with a silica/organic polymer/silane complex as taught in U.S. Pat. No. 4,330,446.

A further example of composite coatings involves the application of protective coatings of silicate to resin-free basecoat compositions of particulate metal and hexavalent chromium-providing substance on ferrous substrates. This composite has been disclosed in U.S. Pat. No. 4,365,003.

Because of the corrosion resistance of such coating composites, they have attracted the attention of the automotive industry for treating small metal parts, e.g., metal fasteners, nuts, bolts and interior body panels. However, the appearance of the coating composites vary, depending on the formulation of the coating, the type of basis metal substrate and the process. Moreover, many such small parts are traditionally provided with a top-coating that will give the part a smooth as well as corrosion resistant coating, plus a lustrous black appearance. It would, therefore, be desirable to achieve a corrosion resistant coating composite having a black pigmented topcoating which can be applied to a wide variety of basecoated substrates providing superior corrosion resistance and excellent black pigmented hiding power.

It would also be desirable to provide a topcoating composition which is simple and readily manufactured from commercially available components, easily applied by conventional techniques and economical to cure. Further, desirable advantages would reside in a composition showing excellent shelf stability without the need for special packaging, a composition that is environmentally desirable being water-based to eliminate problems of pollution and toxicity and a composition amenable to water cleanup.

SUMMARY OF THE INVENTION

In accordance with the present invention, a black pigmented corrosion resistant coating composition has now been discovered for application over a wide variety of basecoated metal surfaces. The resulting coating composite imparts improved corrosion resistance to such base-coated metal surfaces. Moreover, the present invention obtains such effects in straightforward coating operation.

It has been further discovered that the coating composition not only has enhanced resistance against separation, but also provides excellent pigment stability, i.e., resists pigment flocculation and agglomeration in the presence of strong electrolyte and high pH. The coating achieves excellent hiding power with minimal pigment loading. It can be heat cured, with the resultant coating being heat and mar resistant.

The coating composite of the present invention first comprises at least one corrosion resistant basecoating established from coatings containing chromium in non-elemental form. For enhanced corrosion resistance, the particularly preferred composites of the present invention have a basecoat composition containing hexavalent chromium-providing substance and pulverulent metal plus liquid medium. Other basecoating materials include chromium conversion coatings.

Broadly, the present invention is directed to a shelf-stable, black-pigmented coating composition for providing a smooth, uniform baked-on coating especially adapted for use as a corrosion resistant topcoating over a previously coated base metal substrate having a coating containing chromium in non-elemental form, said coating composition being adapted as a one-package, chromium-free and particulate-metal-free composition having a pH of less than about 10, said composition comprising an aqueous colloidal dispersion of carbon black providing at least about 0.5 weight percent carbon black pigment to the composition, thickening agent in an amount of less than about 2 weight percent of thickening agent, basis weight of the composition, from about 1 to 40 weight percent of an aqueous silica sol having a pH of not above about 10, and from about 4 to 40 weight percent of aqueous acrylic resin dispersion.

In other aspects the present invention is directed to the method of preparing the foregoing described coating composition, as well as the metal substrates protected by coating composites having the topcoating as provided herein.

DESCRIPTION OF THE PREFERRED EMBODIMENTS

The basecoatings of the coating composite need not be complex and can be selected from, but not limited to, chromium conversion coatings and hexavalent chromium-providing compositions. For the purposes of the present invention, it is contemplated that the topcoatings can be useful when applied to elemental sacrificial metal coatings which can include zinc electroplate and hot dipped galvanization. However, the topcoatings are especially tailored to provide protection where an underlying substrate has been undercoated with a coating containing chromium in non-elemental form. Conversion coatings can be of chromium and are typically prepared from chromic acid. Such coatings form highly adherent microcrystalline coatings on the metal substrate surface. The microcrystalline base provides a good bonding surface to "lock in" a subsequent topcoating application. The conversion coatings are applied by conventional method well described in the art.

Of particular interest in the practice of the present invention are the base coatings containing hexavalent chromium-providing substance and pulverulent metal in liquid medium. The particular basecoat of interest contains chromic acid as the hexavalent chromium-providing substance or its equivalent in liquid medium, for example, chromium trioxide or chromic acid anhydride.

For supplying the liquid medium, the hexavalent chromium-providing basecoats are water-based for economy. Other liquids may generally be used, such as taught by U.S. Pat. No. 3,437,531, blending chlorinated hydrocarbons with various alcohols including tertiary butyl alcohol. However, in the selection of liquid medium for the present invention, economy will generally be of major importance, and such medium will most always contain readily commercially available liquids.

The preferred hexavalent chromium-providing compositions may contain thickeners, such as water soluble cellulose ethers. The preferred basecoating will also contain high boiling organic liquid for enhanced coating adhesion and corrosion resistance. For economy, these particular coating compositions preferably contain between about 0.01 to 3 weight percent of water soluble cellulose ether. Examples of such ethers are hydroxyethylcellulose, methylcellulose, methylhydroxypropylcellulose, ethylhydroxyethylcellulose, methylethylcellulose or mixtures thereof. Although the cellulose ether needs to be water soluble to augment thickening for these particular coating compositions, it need not be soluble in the high boiling organic liquid. The organic liquid can contribute up to 50 volume percent of the basecoating composition based on the total volume of liquid in the composition.

For the preferred basecoat composition, the organic liquid has a boiling point at atmospheric pressure above 100° C., while preferably being water soluble. The organic liquids contain carbon, oxygen and hydrogen and have at least one oxygen containing constituent that may be hydroxyl, oxo, or a low molecular weight ether group, e.g., a $C_1$–$C_4$ ether group. For convenience, such liquids can be referred to as "oxyhydroxy liquids". Since water dispersibility and particularly water solubility is sought, polymeric hydrocarbons are not suitable, and advantageously serviceable hydrocarbons contain less than about 15 carbon atoms. Particular hydrocarbons which may be present in these preferred basecoating compositions include tri- and tetraethylene glycol, di- and tripropylene glycol, the monomethyl, diethyl and ethyl ethers of these glycols, as well as diacetone alcohol, the low molecular weight ethers of diethylene glycol and mixtures of the foregoing.

The particulate metal of the undercoating composition can in general be any suitable electrically conductive metal such as finely divided aluminum, manganese, cadmium, steel, magnesium or zinc. The preferred metals being zinc powder, e.g., atomized and condensed particulates, or zinc flake or aluminum flake or mixtures thereof. Flake may be blended with pulverulent metal powder, but typically in only minor amounts of powder. The metallic powders typically have particle size such that all particles pass 100 mesh and a major amount pass 325 mesh ("mesh" is used as in U.S. Standard Sieve Series). The powders are generally spherical as opposed to the flat leaf shape of the flake.

The basecoating weight for the preferred basecoat compositions may vary to a considerable degree but will most typically be present in an amount from about 50 to about 5,000 milligrams per square foot of treated substrate. Generally, the coating should have a weight ratio of chromium, expressed as chromium and not $CrO_3$, to pulverulent metal of less than about 0.5:1. The weight range of chromium will generally be present in the amount of about 5 to about 500 milligrams per square foot of substrate. The basecoating will often contain about 10 to 1000 milligrams per square foot of coated substrate of pulverulent metal.

The basecoat compositions of particular interest are heat cured for providing a water-resistant and corrosion-resistant coating. Curing can be achieved by baking at elevated temperatures. Curing typically takes place at a temperature on the order of from about 300° F. to about 500° F. In general, cure temperatures on the order of from about 300° F. to about 1000° F. are useful. Cure temperatures reaching above about 1000° F. are uneconomical and undesirable. For best coating performance, such basecoat is typically cured at temperatures within the range from about 325° F. to about 600° F. and preferably at a temperature from about 350° F. to about 450° F.

The topcoat of the present invention comprises a blend of components formulated typically in aqueous medium. The components chiefly employed include thickening agent, aqueous colloidal carbon black dispersion, an aqueous silica sol and aqueous acrylic resin dispersion. Thus all of the major topcoat components are water-based for efficiency and economy. Although alternative nonaqueous components may be contemplated so long as there is no incompatible mixing, e.g., of an aqueous acrylic resin dispersion with a nonaqueous based silica sol, these are not of particular interest for the invention and thus aqueous systems are always referred to herein. For the "aqueous medium" as this term is used herein, such is simply water for economy, but it is to be understood that other liquids not providing phase separation on blending with water, as well as being readily fugitive under topcoat cure conditions, e.g., glycols, may be present. In addition to compatibility of liquid medium for the silica sol and acrylic resin dispersion, the term is also used herein to denote suitability of pH between such ingredients when they are water based, as will be discussed in more detail hereinbelow.

The black pigment will be an aqueous colloidal dispersion of carbon black. The carbon blacks can be powdered blacks or beaded blacks and further can be channel blacks, furnace blacks, thermal blacks or their mixtures. The carbon black pigment in the colloidal dispersion may have mean particle size on the order ranging from about 10 to about 100 millimicrons and contain from about 30 to about 60 percent by weight of solids.

The carbon black colloidal dispersion will contribute from about 0.5 to 10 weight percent of carbon black solids to the coating composition basis total composition weight. Less than about 0.5 weight percent of the carbon black can be insufficient to provide desirable hiding power for the cured coating while greater than about 10 weight percent of carbon black pigment can yield thick, viscous compositions which are difficult to apply. For best ease of application plus hiding power of the cured film, the carbon black dispersion will advantageously contribute from about 1 to about 5 weight percent of solids to the total composition weight. Otherwise, except as explicitly discussed hereinbelow, the composition should be essentially pigment and filler free, that is, contain less than about 2 weight percent of additional pigment plus filler. Preferably, for best coating performance, the coating compositions will be free of additional pigment and filler.

It is critical that the topcoat formulation have a solids weight ratio of acrylic resin to black pigment of greater than 1:1 to provide for a topcoating of enhanced corrosion resistance. Such ratio of acrylic resin to particulate black pigment can be as high as on the order of 25:1 or more, but most generally will be within the range from about 2:1 to about 20:1. Preferably, for best ease of formulation plus composition stability, the weight ratio of acrylic resin to black pigment will be from about 4:1 to about 15:1. Most always, the resulting topcoating film will have a pigment volume concentration ("PVC") of less than about 12, basis sum of the acrylic resin plus silica sol solids. For most desirable coating characteristics, including hiding power and corrosion resistance, such PVC of the cured topcoat film will be on the order of about 9 or less, e.g., 4 to 8.

The thickening agent is a xanthan gum hydrophilic colloid, known commercially simply as "xanthan gum", which term may also be used herein for convenience. It may also be termed a heteropolysaccharide, or carbohydrate, as they can be produced by the fermentation of a carbohydrate, for example by the bacterium *Xanthomonas campestris*. Such xanthan gum hydrophilic colloids are complex in nature and have high molecular weight, e.g., more than one million is typical. Such substance is available as a powder that exhibits solubility in water. The use of the xanthan gum hydrophilic colloid in water, even in very minor amounts, exhibits excellent suspending property. Thus, although greater amounts may be used, only from 0.1 to 2 weight percent is usually needed in the coating composition, with from about 0.1 to about 0.5 weight percent being more typical.

The "silica sol", as the term is used herein may also be referred to as a colloidal silica. The silica sol should contain from at least 15 weight percent solids, and may contain up to about 60 weight percent solids or more. Advantageously, for efficiency in achieving desirable coating properties, the colloidal silica will contain from about 20 to 50 weight percent solids. Preferably for best coating performance, the silica sol will contribute $SiO_2$ to the topcoat composition while being free from alkali metal or other metals, and thereby being otherwise stabilized.

The silica sol will most always contribute from about 1 to about 40 weight percent to the total coating composition. Less than about 1 weight percent can be insufficient for providing enhanced corrosion resistance of the cured topcoating while greater than 40 weight percent can lead to viscous compositions that are difficult to apply. Advantageously for best ease of application plus desirable topcoating corrosion resistance, the coating composition will contain from about 2 to about 25 percent by weight of silica sol.

The aqueous acrylic resin dispersion will most usually have a solids content within the range from about 20 to about 70 weight percent. For most suitable viscosities providing best ease of mixing in forming the coating composition, the acrylic resin selected will typically have from about 30 to about 55 weight percent solids. It is to be understood that the resin selected can be a commercially available resin. These resins can contain additives which may include constituents such as an emulsion stabilizer, that may also serve as a pH adjuster, a preservative and also surface active agent. It is contemplated that for the acrylic resin at least the major amount of the resin will be supplied by acrylic polymer but that copolymers can be present. Most typically the useful resin will contain no more than about 5 to 10 weight percent of polymerized monomers other than acrylic resin.

As has been mentioned hereinabove, the acrylic resin is a water-based dispersion resin, and is used with a water-based silica sol. For these aqueous compositions of the present invention, it is necessary that they have compatible pH. By this, for example, it is meant that for the silica sols having a pH in aqueous medium of above 7, an acrylic resin should be selected that likewise has a pH in aqueous medium of above 7. Generally such compatible resin and sol will each have a pH within the range from about 7.5 to about 10, and more often have a pH of less than about 9.5, and thereby provide a coating composition of enhanced stability against gellation.

The coating composition will most always contain from about 4 to about 40 weight percent of acrylic resin dispersion, basis total composition weight. An amount of less than about 4 weight percent resin can be insufficient for providing a composition of desirable stability. On the other hand, greater than about 40 weight percent resin will yield compositions which are highly viscous and difficult to apply. For most stable dispersions with desirable viscosity, the coating composition will preferably contain from about 10 to about 30 percent by weight of acrylic resin.

It has been found that amorphous silicas can usefully serve as thixotropic agents. They can be easily blended into the aqueous composition medium and are serviceable in helping to retard coating separation of topcoat to basecoat. The useful amorphous silicas are aqueous solutions or particulate materials having $SiO_2$ content of well above 80 weight percent. They may contribute from as little as about 0.2 to 5 percent by weight of the coating composition. Less than about 0.2 percent will be insufficient to desirably retard coating separation while greater than about 5 percent can be uneconomical.

It has also been found useful to add glycols to the composition for enhancing coating uniformity. Since water dispersibility and particularly water solubility are sought, the glycols advantageously contain less than about 15 carbon atoms. Particularly useful glycols are those that are preferred in basecoating compositions including tri- and tetraethylene glycol, di- and tripropylene glycol, the monomethyl, diethyl and ethyl ethers of these glycols as well as the low molecular weight ethers of diethylene glycol and mixtures of the foregoing. Typically such glycols are added to the coating composition in an amount of about 1 to 20 weight percent. Less than about 1 weight percent will be insufficient to enhance coating uniformity while greater than about 20 weight percent can be uneconomical for the coating composition.

Additional ingredients useful for adding to the coating composition can include a pH adjusting agent. This will typically be a hydroxide. Ammonium hydroxide is preferred for efficiency and economy. Usually as little as about 0.01 to about 0.1 weight percent of hydroxide is used for pH adjustment. Also contributing to pH adjustment, and useful in the composition is a heavy metal oxide, i.e., other than an alkali metal oxide, such as the useful zinc oxide. The zinc oxide can be readily added to the composition as a finely divided particulate substance. Usually it will be present in the composition in an amount comparable to the weight amount of the pH adjusting agent.

For compositions where lubricant will be used, it is advantageous that the lubricant be a polymeric lubricant, typically a finely divided polyhalocarbon. Usually, such polyhalocarbon will be serviceable as an aqueous dispersion of the finely divided particulate solids in an aqueous medium. Although a number of useful polymeric lubricants are contemplated, for efficiency in lubrication and economy, the preferred lubricant is polytetrofluoroethylene, either alone, or together with other useful substances including ethylene-acrylic acid copolymers.

It is desirable that such lubricant material be pre-blended into an aqueous acrylic resin dispersion. This can be acrylic resin dispersion in addition to the resin dispersion already present in the topcoat composition. Although useful acrylic resin dispersions can be those as discussed hereinbefore, it is particularly advantageous for ready blending of the lubricant with the dispersion resin to use an ethylene/acrylic acid copolymer resin. In such pre-blended lubricant mixture, usually for each 5 to 10 weight parts of lubricant there will be present from about 30 to 60 weight parts of copolymer. The lubricant when admixed with the topcoat composition, will contribute from about 0.5 weight percent to about 10 weight percent of lubricant to such topcoat composition.

Ingredients for the composition can be blended together by conventional mixing techniques, e.g., vigorous stirring. To the water medium there can be added the thickening agent and colloidal silica. Prior to that, either amorphous silica or metallic oxide or both may be present in the aqueous medium. Following this, the acrylic resin and any pH adjusting agent should be added, as mixing continues. Then the colloidal dispersion of carbon black and lastly the aqueous silica sol are blended into the mixture to form the final coating composition. If a lubricant, e.g., as a powder or in a copolymer dispersion is used, it can be first added, such as before the amorphous silica or metallic oxide. The resulting topcoating composition can be expected to have a specific gravity of from about 1.04 to about 1.06. It will furthermore typically have a viscosity, in centipoises at 70° F., of from about 15 to 2,000.

It is contemplated that the topcoating composition will almost always also include a surface active agent, or "wetting" agent, and a defoaming agent as formulation aids. The defoaming agent will typically be present in the aqueous colloidal dispersion of carbon black pigment. The defoaming agent or wetting agent, or surface active agent, are all present in minor amount. These will usually be agents of the anionic or nonionic type. Typically, the concentration of wetting agent ranges from about 0.05 to 0.5 weight percent of the total formulation, although more usually from about 0.1 to about 0.3 weight percent of such surface active agent is present. It is typical that the wetting agent will be present in the aqueous acrylic resin dispersion.

It is to be understood that the composition is chromium-free. Also the composition is phosphate-free, and the composition is also free from particulate metals, such as metal flakes and powdered metals.

The topcoat composition is capable of air drying at room temperature to a tack-free condition, but must be cured for providing a water-resistant and corrosion-resistant topcoating. Curing can be achieved by baking, e.g., at elevated temperatures. Low cure temperatures on the order of about 150° F. to about 300° F. may be useful. In general, cure temperatures on the order of from about 200° F. to about 400° F. are used. Cure temperatures reaching above about 500° F. are uneconomical and undesirable. For best coating performance, the topcoat of the present invention is typically cured at temperatures within the range from about 250° F. to about 400° F.

Topcoating may be applied by various techniques including brush, roller or conventional or electrostatic spray coating as well as the preferred immersion techniques including "dip drain" and "dip spin" techniques. Dip drain is accomplished by simply immersing the substrate into the coating and letting the excess drain off. Dip spin is achieved by placing the parts to be coated in a basket and dipping same into the coating. The excess coating is removed by rapidly rotating the coated parts maintained in the basket. Articles can be topcoated that are at elevated temperature, as from curing of the preferred undercoating, by a procedure such as dip spin, dip drain or spray coat. By such operation, some to all of the topcoat curing is achieved without further heating.

The topcoat should be present in an amount above about 200 milligrams per square foot of coated substrate. For economy, topcoat weights for the cured topcoating will not exceed about 5,000 milligrams per square foot. Preferably, for best efficiency and economy, the topcoat is present in an amount from about 1,000–4,000 milligrams per square foot.

The following examples will serve to further illustrate the operation and advantages of the present invention. These examples should not be considered, however, as a limitation upon the scope of the present invention.

Preparation of Test Parts

Test parts are typically prepared for coating by first immersing in water which has incorporated therein 2 to 5 ounces of cleaning solution per gallon of water. The alkaline cleaning solution is a commercially available material of typically a substantially major amount by weight of potassium hydroxide with a minor weight amount of a water-softening phosphate. The bath is maintained at a temperature of about 150° to 180° F. Thereafter, the test parts are scrubbed with a cleaning pad which is a porous, fibrous pad of synthetic fiber impregnated with an abrasive. The scrubbed parts may then be water rinsed and again immersed in the cleaning solution. After the cleaning treatment, the parts are rinsed with tap water and may be dried.

Application of Coating to Test Parts and Coating Weight

Clean parts are typically coated by dipping into composition, removing and draining excess composition therefrom, sometimes with a mild shaking action, and then immediately baking or air drying at room temperature until the coating is dry to the touch and then baking. Baking proceeds in a hot air convection oven at temperatures and with times as specified in the examples.

Coating weights for parts, generally expressed as a weight per unit of surface area, are typically determined by selecting a random sampling of parts of a known surface area and weighing the sample before coating. After the sample has been coated, it is reweighed and the coating weight per selected unit of surface area, most always presented as milligrams per square foot (mg./sq. ft.), is arrived at by straightforward calculation.

Corrosion Resistance Test (ASTM B117) and Rating

Corrosion resistance of coated parts is measured by means of the standard salt spray (fog) test for paints and varnishes ASTM B117. In this test, the parts are placed in a chamber kept at constant temperature where they are exposed to a fine spray (fog) of a 5 percent salt solution for specified periods of time, rinsed in water and dried. The extent of corrosion on the test parts can be expressed as percent red rust. It is determined by comparing parts one with another, all by visual inspection. Where test panels are scribed, the scribing is performed before corrosion resistance testing by cutting an "X" configuration on the face of the panel. The scribe lines are made through the coatings to expose the base metal. The extent of corrosion along the scribe lines is also made by visual inspection and through comparison among test panels.

EXAMPLE 1 Basecoat

To 55 milliliters (mls.) of dipropylene glycol (DPG), there was blended with moderate agitation 1.0 ml. of a nonionic wetter having a viscosity in centipoises at 25° C. of 280 and a density at 25° C. of 10 pounds per gallon, and 1.0 gram (gm.) of hydroxypropyl methyl cellulose thickener. The thickener is a very finely-divided cream to white colored powder. To this thickener mixture there was then added 84 gms. of a flaked zinc/aluminum mixture, providing 75.5 gms. zinc and 8.5 gms. aluminum, using agitation during the addition. The zinc flake has particle thickness of about 0.1 to 0.5 micron and a longest dimension of discrete particles of about 80 microns.

Separately there was added to 88 mls. of deionized water 12.5 gms. of $CrO_3$, and to this there was added an additional 88 mls. of deionized water. To this chromic acid solution there was added about 3 gms. of zinc oxide. The resulting chromic acid solution was slowly added to the metal flake dispersion to form a basecoating composition.

Topcoat

For a topcoat composition there was added to 477.8 gms. of water, 10 gms. of amorphous silica having an average ultimate particle size of 0.021 micron, a specific gravity of 2.1 and a pH as a 5% solution at 25° C. of 6.5-7.3. To this there was added 2 gms. of xanthan gum thickening agent and 69.6 gms. of colloidal silica, having a 50 weight percent solids content. The colloidal silica had submicron sized silica solids and a pH of 8.5.

Next there was blended in 377.7 gms. of aqueous acrylic dispersion resin having a viscosity in centipoises at 25° C. of 100 to 300, a pH of 9 to 9.6 and a solids content of 45 to 46 percent by weight. There was then added 4 gms. of ammonia hydroxide to the blend. To the resulting blend there was then admixed 59.9 gms. of a colloidal dispersion of a furnace carbon black pigment. This colloidal dispersion had a total solids of 50 weight percent carbon black, contained nonionic dispersing agent and had a pH of 10-11.5. During topcoat preparation, continuous moderate mixing was used, and an about 5 minute interval was observed before the addition of the next ingredient. The resultant final topcoating dispersion had a 3.8:1 ratio by weight of silica solids to acrylic resin solids.

Steel parts coated with two coats of the basecoat, e.g., for a basecoat weight of 2,000 mg./sq. ft., and topcoated once with the topcoat, providing a topcoating weight on the order of 1,500 mg./sq. ft., can be expected to be subjected to the above-described corrosion resistance test for over 1,000 hours without showing red rust.

EXAMPLE 2

To prepare a lubricious topcoat composition, there was first blended together 10 gms. of polytetrafluoroethylene (PTFE) resin (having a bulk density of 300-500 grams/liter, an average particle size of 6-9 microns and a density of 2.2 g/cm.3 together with 50 gms. of ethylene/acrylic acid copolymer dispersion having 25% solids content, a pH of 9-10 and a liquid density at 25° C. of 0.985 $g/cm^3$. To this blend, following the procedure and using the ingredients of Example 1, there was added 644.7 gms. water, 1 gm. zinc oxide, 10 gms. of amorphous silica, 4 gms. thickening agent, 200 gms. acrylic dispersion resin, 2 gms. ammonium hydroxide, 30 gms. of colloidal carbon black, 36.8 gms. of colloidal silica and 1.5 gms. of an off-white, powdery antimicrobial agent containing potassium iodide, sodium tetraborate and 2-chloro-N-(hydroxymethyl-)acetamide. The resulting lubricious topcoat composition had a specific gravity of 1.04-1.05 and a pH at 70° F. of 9.0.

Steel bolt test parts were coated, in the manner described hereinbefore in connection with the examples, with the basecoat composition described in Example 1. The resulting basecoat coating weight was 1,600 mg./sq. ft. The basecoated parts were then topcoated as described hereinabove, including curing for 10 minutes at 350° F., to provide a topcoating weight of 1,100 mg./sq. ft. In the above-described corrosion resistance test, these resulting parts showed no red rust after 912 hours of testing.

EXAMPLE 3

Composition stability data was gathered for invention samples. For the test, the composition used was as described in Example 1 with the ingredients of Example 1, but using the following proportions: 478.7 gms. water, 10 gms. amorphous silica, 1 gm. thickening agent, 69.8 gms. colloidal silica, 378.4 gms. acrylic dispersion resin, 2.1 gms. ammonium hydroxide and 60.2 gms. colloidal carbon black.

One sample (Sample 1) in this test was prepared as a five gallon unit and base measurements were made (4 hour sample age). A 1,000 ml. aliquot of this sample was stored in a sealed container at 70° F. and this retained aliquot was used for the 20-week test. A second sample (Sample 2) was prepared as a second five gallon unit for corroboration purposes. The second sample tests were all prepared on the five gallon unit. All test results are noted in the table below. For each sample, pH was measured with a meter and viscosity was determined with a Brookfield Viscometer, using Spindle No. 1 at 60 rpm. and a bath temperature of 70° F. Specific gravity of the samples was measured by a hydrometer. The results of this storage test are as follows:

TABLE 1

| Sample | Age | pH | Brookfield Viscosity | Specific Gravity |
|---|---|---|---|---|
| Sample 1 | 4 Hours | 9.3 | 20.6 | 1.055 |
| Sample 1 | 20 Weeks | 8.8 | 32.4 | 1.055 |
| Sample 2 | 4 Hours | 9.4 | 17.6 | 1.055 |
| Sample 2 | 20 Weeks | 8.6 | 25.6 | 1.055 |

EXAMPLE 4

For comparative testing, corrosion data were gathered from different test specimens. For one comparative sample, a cold-rolled, low-carbon, 4×8 inch steel test panel was used. This panel was coated in the manner described hereinbefore in connection with the examples with the lubricious topcoating of Example 2. The resulting topcoat weight was 1,900 mg./sq. ft. No basecoat was used for this comparative test panel.

A second comparative test panel was a commercial zinc phosphated steel panel. This zinc phosphate basecoated panel was topcoated with the above-described lubricious topcoating which provided a topcoating weight of 1,700 mg./sq. ft. The applied topcoating was cured for 10 minutes at 350° F.

For the test panel of the present invention, an above-described cold-rolled steel panel was first base-coated in the manner described hereinbefore with the basecoat composition of Example 1. The basecoated panel was cured for 15 minutes at 608° F. The resulting basecoat weight was 1500 mg./sq. ft. This panel was then topcoated with the above-discussed lubricious topcoating which was cured for 10 minutes at 350° F. The topcoat weight was 1,500 mg./sq. ft.

All three test panels were then scribed in the manner described hereinabove in connection with the examples. Scribed panels were then subjected to corrosion resistance testing. The results are reported in Table 2 below.

TABLE 2

| Panel Substrate | Topcoat Weight Mg./Ft.$^2$ | Corrosion Resistance Results 24 hours | |
|---|---|---|---|
| | | Field | Scribe |
| Bare Steel | 1,900 | 100 | 100 |
| Comparative Zinc Phosphate | 1,700 | 21 | 100 |
| Invention Chromium Basecoat | 1,500 | 0 | 0 |

What is claimed is:

1. A shelf-stable, black-pigmented coating composition for providing a smooth, uniform, baked-on coating especially adapted for use as a corrosion resistant topcoating over a previously coated base metal substrate having a coating containing chromium in non-elemental form, said coating composition being adapted as a one-package, chromium-free and particulate-metal-free composition having a pH of less than about 10, said composition comprising an aqueous colloidal dispersion of carbon black providing at least about 0.5 weight percent carbon black pigment to said composition, thickening agent in an amount of less than about 2 weight percent of thickening agent, basis weight of said composition, from about 1 to 40 weight percent of an aqueous silica sol having a pH of not above about 10, above about 0.2 percent by weight of amorphous silica and from about 4 to 40 weight percent of aqueous acrylic resin dispersion.

2. The coating composition of claim 1 further characterized by containing polymeric lubricant.

3. The coating composition of claim 2 wherein said lubricant is a fluorocarbon which is present in an amount of at least about 0.5 weight percent.

4. The coating composition of claim 1 containing from about 0.5 to 10 percent by weight of carbon black pigment, basis total composition weight, while having a weight ratio of acrylic resin to carbon black pigment of greater than 1:1.

5. The coating composition of claim 1 wherein said carbon black pigment is selected from the group consisting of carbon black, graphite and mixtures thereof, and said colloidal dispersion thereof contains from about 30 to about 60 percent by weight of solids.

6. The coating composition of claim 1 wherein said carbon black is selected from the group consisting of channel blacks, furnace blacks, thermal blacks, and their mixtures, said carbon black has a mean particle size within the range from about 10 to about 100 millimicrons, and said composition is otherwise essentially free of filler and other pigment.

7. The coating composition of claim 1 wherein said thickening agent is present in an amount from about 0.1 to about 0.4 weight percent.

8. The coating composition of claim 1 wherein said thickening agent is a xanthan gum hydrophilic colloid.

9. The coating composition of claim 1 wherein said acrylic resin is an aqueous dispersion copolymer resin and is present in an amount from about 10 to about 30 weight percent.

10. The coating composition of claim 1 wherein said acrylic resin is an aqueous dispersion copolymer resin having a pH of greater than about 7 and contains from about 20 to about 70 percent by weight of solids.

11. The coating composition of claim 4 wherein said weight ratio of acrylic resin to carbon black pigment is within the range from about 5:1 to about 10:1.

12. The coating composition of claim 1 wherein said silica sol contributes $SiO_2$ to said composition, is free from alkali metal and is present in an amount from about 1 to about 10 weight percent and has a pH of greater than about 7 but less than about 9.5, with said composition having a pH of from about 8 to less than about 9.5.

13. The coating composition of claim 1 wherein said silica sol contains from about 15 to about 60 percent by weight of solids.

14. The coating composition of claim 1 characterized by having a viscosity, in centipoises at 70° F., of from about 15 to 2,000 and having a specific gravity within the range of from about 1.04 to about 1.06.

15. The coating composition of claim 1 further characterized by containing pH adjusting agent.

16. The coating composition of claim 1 further characterized by containing a glycol in an amount not substantially above about 20 percent by weight.

* * * * *